United States Patent [19]

Hirobe et al.

[11] Patent Number: 4,792,866

[45] Date of Patent: Dec. 20, 1988

[54] STILL PICTURE RECORDING APPARATUS

[75] Inventors: Hitoshi Hirobe; Kaoru Adachi, both of Tokyo, Japan

[73] Assignee: Fuji Photo Film Co., Ltd., Kanagawa, Japan

[21] Appl. No.: 123,289

[22] Filed: Nov. 20, 1987

[30] Foreign Application Priority Data

Nov. 20, 1986 [JP] Japan .................. 61-275243

[51] Int. Cl.4 ............ H04N 5/781; H04N 5/907; H04N 5/92

[52] U.S. Cl. ................. 360/10.1; 360/19.1; 358/341; 358/342

[58] Field of Search ........... 360/10.1, 10.2, 13, 360/19.1, 33.1, 35.1, 9.1, 10.3, 11.1, 61–62, 36.1, 36.2; 358/341, 342, 906

[56] References Cited

U.S. PATENT DOCUMENTS

| | | | |
|---|---|---|---|
| 4,531,161 | 7/1985 | Murakoshi | 360/10.1 |
| 4,546,391 | 10/1985 | Kimura | 360/10.1 |
| 4,583,131 | 4/1986 | Dakin | 358/342 |
| 4,672,471 | 6/1987 | Gouda | 358/341 |

Primary Examiner—Marvin L. Nussbaum
Attorney, Agent, or Firm—Birch, Stewart, Kolasch & Birch

[57] ABSTRACT

In a still picture recording apparatus such as an electronic still camera, an audio signal compressed in its time base is recorded on a magnetic disk together with a video signal. In order to relate the timing of recording the audio signal to that of the video signal, the audio signal to be recorded is processed in an audio signal processing circuit in response to the manipulation of a manual switch, and the video signal to be recorded is processed in a video signal processing circuit after a required delay time relative to the audio signal, so that the audio signal and the video signal can be recorded in matching relation without the possibility of mismanipulation and without the need for troublesome recording procedures.

6 Claims, 2 Drawing Sheets

STILL PICTURE RECORDING APPARATUS

BACKGROUND OF THE INVENTION

An apparatus such as an electronic still camera recording a video signal of a still picture on a magnetic disk is commonly known in the art. An electronic still camera using a floppy disk having a diameter of about 47 mm and a thickness of about 40 μm for recording has been standardized and put into practical use. The floppy disk is rotated at a rotational speed of 3,600 rpm, and fifty still pictures are recorded on fifty tracks in the case of field recording, while twenty-five still pictures are recorded on the fifty tracks in the case of frame recording. The track width and track pitch are 60 μm and 100 μm respectively, and a guard band having a width of 40 μm is provided between the tracks. A reproduced picture is displayed on a monitor such as a television receiver or printed out as a hard copy by a printer.

In the record mode for recording an audio signal on such a floppy disk, the time base of the audio signal is compressed, while in the playback mode for reproducing the recorded audio signal from the floppy disk, the time base is expanded. This is because the floppy disk completes one revolution in a period of time of 1/60 sec, and an audio signal corresponding to this period of time can only be recorded on one track. However, when the time base in compressed by, for example, 1/640, the audio signal corresponding to an extended period of time of about 10 sec can be recorded on one track. Audio signals usually recorded on such a floppy disk include those of various sound frequency ranges such as oral explanation of recorded still pictures, background music recorded for observation of reproduced still pictures and background music recorded during photographing with an electronic still camera.

FIG. 3 shows diagrammatically the structure of an audio signal recording system, and FIG. 4 shows diagrammatically the structure of a video signal recording system.

As shown in FIG. 3, an audio signal 2 transmitted from a microphone 1 is applied to a time-base compressor 4 after being amplified by a signal processing unit 3. The time-base compressor 4 includes an A/D converter 5, a RAM (random access memory) 6, a D/A converter 7 and an address counter 10 and is designed to compress the time base by a factor of 1/640. Described in more detail, an audio output signal 3a of the signal processing unit 3 is sampled in the A/D converter 5 at a sampling frequency fs to be converted into a digital signal 5a. This digital signal 5a is written in the RAM 6 in synchronism with a clock signal having a frequency fs. For the purpose of writing, an address signal having a clock frequency fs is applied from the address counter 10 to the RAM 6. The digital signal written in the RAM 6 is read out from the RAM 6 in synchronism with a clock signal having a frequency of 640×fs and is converted by the D/A converter 7 into an analog signal 7a at a clock frequency of 640×fs.

The analog audio signal 7a compressed in the time base is applied from the D/A converter 7 to a frequency (FM) modulator 17 where the signal 7a is converted into an FM audio signal. The output signal of the FM modulator 17 is applied through a recording amplifier 18 to a magnetic head 8 to be recorded on a suitable track of a floppy disk 9. In this manner, the audio signal 2 transmitted from the microphone 1 is recorded on the floppy disk 9 in a form in which its time base is compressed by a factor of 1/640.

On the other hand, in the video signal recording system shown in a simplified form in FIG. 4, a video signal is processed in a signal processing unit 11 including a pre-emphasis circuit and an FM modulator, and the output signal of the signal processing circuit 11 is applied through a recording amplifier 12 to a magnetic head 13 to be recorded on a suitable track of the floppy disk 9. In FIG. 4, a gate opened by a record enable signal, is schematically illustrated as a switch 14.

In an electronic still camera in which a time base compressed audio signal is recorded together with a video signal of a still picture, there is a demand for recording audio information pertinent to the recorded video information. For example, in the case of recording a television signal, there is a demand for displaying a still picture in a matching relation with audio information which lasts for about 10 sec. This is because video information of a still picture corresponding to a period of time or only 1/60 sec is recorded, whereas audio information corresponding to a period of time as long as about 10 sec can be recorded due to the time-base compression. Thus, mismatching between the timing of reproducing the audio information and that of displaying the video information may sometimes occur.

It has been a common practice for a user of such an electronic still camera to select separate procedures for recording an audio signal and a video signal, the video signal being recorded at a timing different from the timing of recording the audio signal so as to attain matching between reproducing the audio information and displaying the video information. That is, the application of a start pulse to the address counter 10 shown in FIG. 3 and the application of a record enable signal to the gate 14 shown in FIG. 4 have been carried out separately. The above manner of manipulation has not necessarily been executed as scheduled, and mismanipulation has been inevitable. Further, the selection of the proper timing of recording the video signal with respect to the timing of recording the audio signal has been quite troublesome.

SUMMARY OF THE INVENTION

With a view to obviate the prior art defects described above, it is an object of the present invention to provide a still picture recording apparatus by which audio information and video information recorded on a magnetic disk can be reproduced and displayed in a matching relation without the possibility of mismanipulation and without the need for troublesome recording procedures.

In accordance with the present invention, there is provided a still picture recording apparatus comprising a video signal processing circuit receiving a video signal of a still picture and converting the input signal into an FM video signal, an audio signal processing circuit receiving an audio signal pertinent to the video signal and compressing the time base of the input signal, a magnetic disk on which output signals of the video signal processing circuit and the audio signal processing circuit are recorded by magnetic head means, and a control circuit connected to a manual switch for actuating the audio signal processing circuit from the time of activation of the manual switch and actuating the video signal processing circuit at a time delayed by a predetermined period relative to the time of activation of the manual switch.

DETAILED DESCRIPTION OF THE INVENTION

Figure 1:
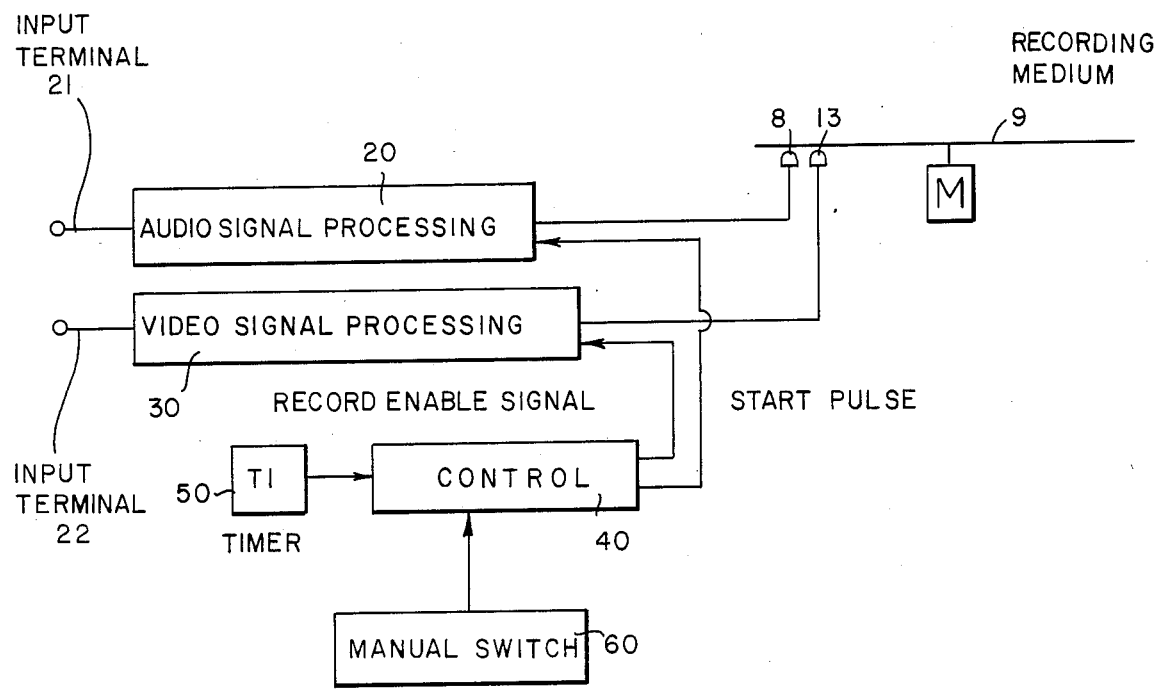
FIG. 1 is a block diagram of a preferred embodiment of the still picture recording apparatus according to the present invention.
Figure 2:
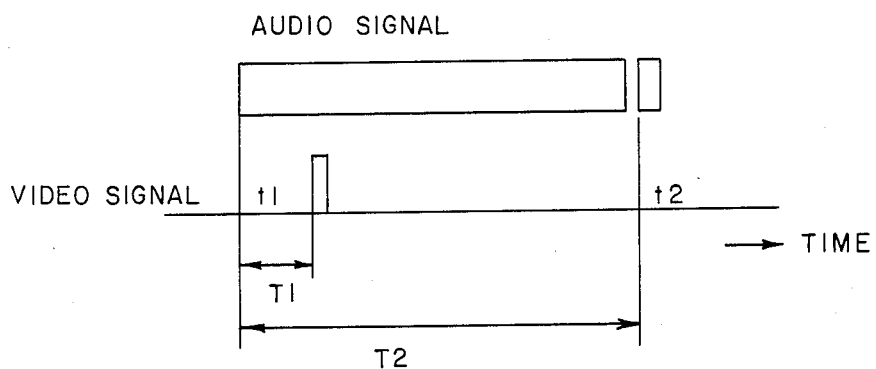
FIG. 2 is a time chart of the operation of the apparatus of FIG. 1.
Figure 3:
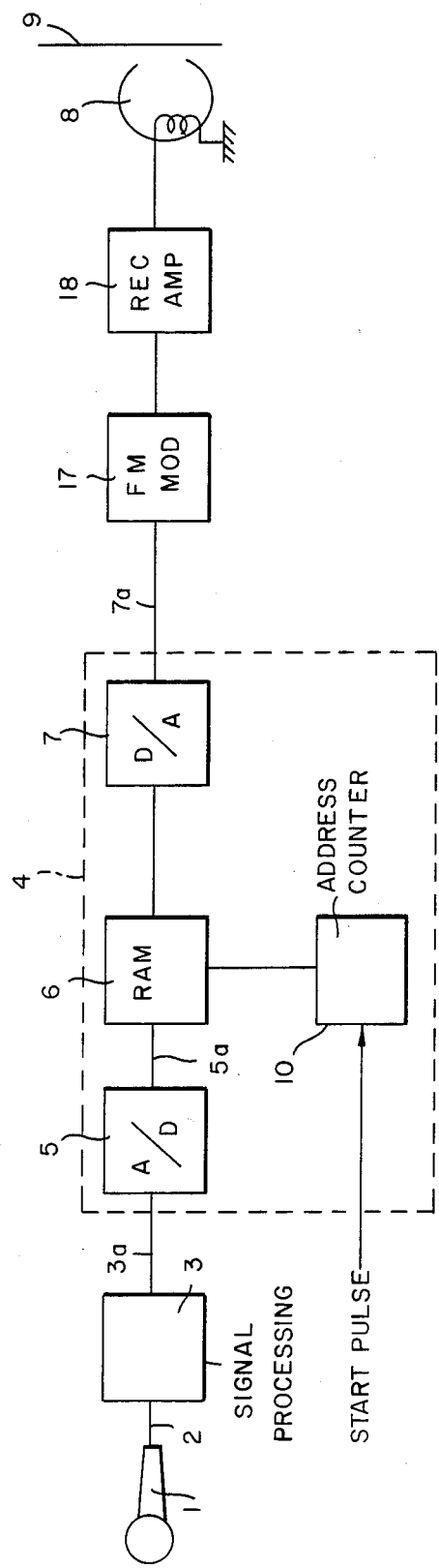
FIG. 3 is a block diagram of an audio signal recording system.

A preferred embodiment of the still picture recording apparatus according to the present invention will now be described with reference to FIGS. 1 and 2. Referring to FIG. 1, an audio signal processing circuit 20 includes a signal processing circuit 3, a time-base compressor 4 (which includes A/D converter 5, RAM 6, D/A converter 7 and address counter 10), an FM modulator 17 and a recording amplifier 18, all of which are shown in FIG. 3. This audio signal processing circuit 20 is connected to magnetic head 8. In this audio signal processing circuit 20, an audio signal applied to an input terminal 21 and having a recording duration of about 10 sec is compressed to 1/60 sec in its time base and is then subjected to frequency modulation and amplification.

Figure 4:
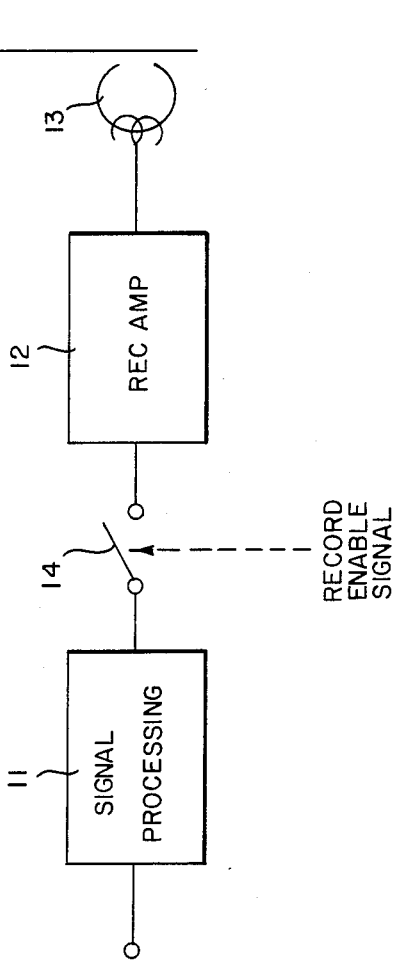
FIG. 4 is a block diagram of a video signal recording system.

A video signal processing circuit 30 shown in FIG. 1 includes signal processing circuit 11, switch 14 and recording amplifier 12, all of which are shown in FIG. 4, and is connected to magnetic head 13. In this video signal processing circuit 30, a video signal applied to an input terminal 22 is subjected to frequency modulation and amplification.

A control circuit 40 is connected to the audio signal processing circuit 20 and video signal processing circuit 30 to control these circuits in response to the actuation of a manual switch 60 on the basis of a period of time set by a timer 50. Described in more detail, when the manual switch 60 connected to the control circuit 40 is actuated, the audio signal processing circuit 20 is actuated from the time of actuation of the switch 60 (time $t_1$ shown in FIG. 2). In other words, a start pulse is applied to the address counter 10 shown in FIG. 3, and an audio signal from the input terminal 21 is A/D converted for a period of time $T_2$ of about 10 sec from the time $t_1$ shown in FIG. 2, and the digital audio signal is written in the RAM 6. This writing of the digital audio signal in the RAM ends at time $t_2$ in FIG. 2, and the audio signal having a recording duration of 1/60 sec as a result of time base compression is recorded by the magnetic head 8 on a floppy disk 9.

On the other hand, after a period of time $T_1$ set by the timer 50 has elapsed from the time $t_1$ of actuation of the manual switch 60, the video signal processing circuit 30 is actuated under control of the control circuit 40. In other words, the switch 14 shown in FIG. 4 is closed by a record enable signal, and a still picture having a recording duration of 1/60 sec is recorded by the magnetic head 13 on the floppy disk 9.

Thus, automatic recording of the still picture starts after the period of time $T_1$ has elapsed from the start of writing the audio signal in the RAM, so that the video information pertinent to the recorded audio information can be recorded. In this case, by changing the time setting $T_1$ of the timer 50, the video information pertinent to the audio information can be recorded at any desired time in relation thereto. Actually, in order to record video information satisfactorily pertinent to audio information, the time setting $T_1$ of the timer 50 is preferably selected to lie within the range of $0 \leq T_1 \leq T_2$.

In the aforementioned embodiment of the present invention, two magnetic heads 8 and 13 are provided for audio and video recording purposes respectively. However, these two magnetic heads may be integrally combined into one composite magnetic head. Also, in view of the fact that the timing of video signal recording differs from that of audio signal recording, a single magnetic head may be used in common for both the audio and video recording purposes.

We claim:

1. A still picture recording apparatus, comprising:
   a video signal processing circuit receiving a video input signal of a still picture and converting the input signal into an FM video signal;
   an audio signal processing circuit receiving an audio input signal pertinent to said video signal and compressing the time base of the audio input signal;
   a magnetic head means and a magnetic disk on which output signals of said video signal processing circuit and said audio signal processing circuit are recorded by said magnetic head means; and
   a control circuit connected to a manual switch for actuating said audio signal processing circuit from the time of actuation of said manual switch and actuating said video signal processing circuit at a time delayed by a predetermined period relative to the time of actuation of said manual switch.

2. A still picture recording apparatus according to claim 1, wherein said magnetic head means is selected from the head group consisting of: an audio-recording magnetic head and a video-recording magnetic head, a composite magnetic head formed by integrally combining an audio-recording magnetic head and a video-recording magnetic head, and a single magnetic head that can be used in common for both audio and video recording purposes.

3. A still picture recording apparatus according to claim 1, wherein said audio signal processing circuit includes a random access memory and an address counter and is actuated in response to the application of a start pulse from said control circuit to said address counter connected to said random access memory.

4. A still picture recording apparatus according to claim 3, wherein said audio signal is written in said random access memory, compressed and then recorded on said magnetic disk.

5. A still picture recording apparatus according to claim 1, further comprising a timer connected to said control circuit, for setting said predetermined period of time by which actuation of said video signal processing circuit is delayed, and
   a switch, included in said video signal processing circuit, being closed by a record enable signal applied from said control circuit after said predetermined period of time set by said timer has elapsed from the time of actuation of said manual switch.

6. A still picture recording apparatus according to claim 5, wherein said predetermined period of time set by said timer ranges from the time of writing said audio signal in said random access memory to the time of ending the audio signal writing operation.

* * * * *